(No Model.)
D. J. ETLY.
FRUIT PICKER.
No. 594,237. Patented Nov. 23, 1897.
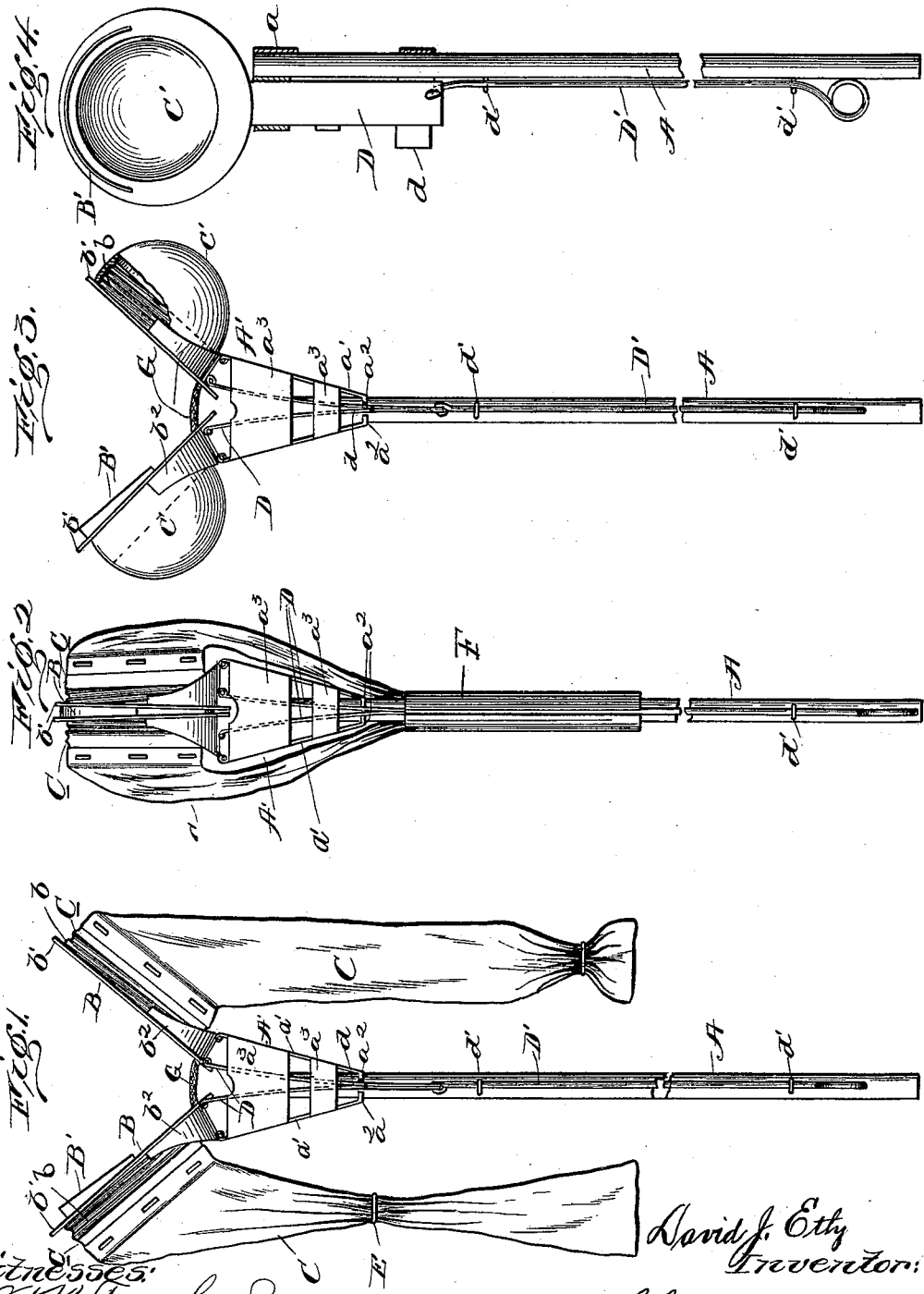

UNITED STATES PATENT OFFICE.

DAVID J. ETLY, OF LOUISVILLE, KENTUCKY.

FRUIT-PICKER.

SPECIFICATION forming part of Letters Patent No. 594,237, dated November 23, 1897.

Application filed December 16, 1896. Serial No. 615,864. (No model.)

*To all whom it may concern:*

Be it known that I, DAVID J. ETLY, a citizen of the United States, residing at Louisville, in the county of Jefferson and State of Kentucky, have invented certain new and useful Improvements in Fruit-Pickers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to that class of fruit-pickers that embody hinged cups mounted upon a pole and opened to receive and discharge the fruit and closed to retain the fruit until the cups have been brought adjacent to the basket or other receptacle provided for the same by operating a wire or similar means connected with the cups.

The objects of the invention are as follows: first, to provide a most simple, cheap, and easily-operated fruit-picker capable of retaining several apples, peaches, pears, or other fruit being picked and of depositing them together into the receptacle provided therefor, thereby saving time by obviating the necessity of picking a fruit and depositing it in a receptacle before another is picked, and at the same time to provide one which shall be so constructed that the fruit will not be bruised by having to fall any distance.

A further object of the invention is to provide a fruit-picker equally as well adapted for picking oranges, lemons, &c., borne on trees having thorns, with which sacks cannot be practically employed, for fruit borne on trees in which the branches and foliage are so thick as to make the use of unconfined sacks impractical or disadvantageous, and for trees having comparatively few branches and light foliage, with which unconfined sacks may be practically employed.

These several objects are accomplished by the construction illustrated in the accompanying drawings, in which—

Figure 1 is an elevation of the device, showing cups having unconfined sacks, said cups being open to receive fruit. Fig. 2 is a side view of the same with the lower ends of the sacks confined to the pole. Fig. 3 is a side view of the device with cups adapted to pick fruit borne on thorny trees, and Fig. 4 is a longitudinal sectional view of the same.

The same letters of reference designate the same parts in the several views.

A designates the pole, which may be of any desired length and, if desirable, made in sections. The top of this pole is provided with a ferrule or collar $a$, which carries an outwardly-projecting frame A', comprising two oppositely-located sides $a'$, having their lower horizontal ends $a^2$ bent toward but not to each other, and the front transverse strips $a^3$ $a^3$.

B B designate rings having peripheral threads $b$ $b$ and annular flanges $b'$ $b'$ and $b^2$ $b^2$, the latter of which are attached to said flanges $b'$ and partly encircle the lower portions of the threaded parts of the rings. The flange $b'$ of one cup is also provided or formed with an inwardly-projecting sharpened blade or flange B', which is located at the upper part thereof and serves as a knife to sever the stems of the fruit.

The cups employed in my device have threaded mouths to engage the rings B, (or other suitable means for detachably securing the cups and rings together may be employed,) and under the generic term "cups" in the present case are included both the flexible sacks C, which are used in picking fruit borne on thornless trees, and the metal concavo-convex parts C', which are employed to pick fruit borne on trees having thorns, said forms of cups being interchangeable, as is obvious.

The rings B are hinged to the respective upper edges of the sides $a'$ of the frame A' and also to the upper ends of arms D, which are longitudinally movable within said frame. These arms are forced upward to open the cups by pressure applied to a strong wire or other suitable means D', which is pivotally attached at its upper end to the lower ends of the arms and extends downward therefrom through eyes $d'$ on the pole to a place convenient to the operator. The cups are closed by pulling downward upon said wire. The arms are formed with projections $d$, which by engaging the under side of the lower strip $a^3$ limit the extent of movement of the cups away from each other.

The sacks C are made of canvas or other suitable fabric and are provided with metal rings $c$, threaded to engage the rings B. In practice each sack will be of such length as to contain several fruit, but not so long that ordinary fruit will be bruised in falling thereinto; but in picking unsound or soft fruit it is desirable to shorten the sacks, as it were, and to this end each sack is encircled by a ring E, which may be adjusted longitudinally of the sack to close the same at any desirable place in the length thereof.

In picking fruit borne upon trees having thick heavy foliage the unconfined sacks are disadvantageous, because they are in such case liable to be injured and will prevent rapid and easy manipulation of the device from one fruit to another. To meet this condition without limiting the capacity of the cups to one, a removable or longitudinally-adjustable tube F is provided, which may be adjusted to confine the lower ends of the sacks to the pole, as clearly shown in Fig. 2.

In picking fruit borne upon thorny trees cups made of fabric are disadvantageous in that they will be punctured or cut by the thorns and soon rendered unfit for use. In such case the cups C are removed and the metal cups C' substituted therefor.

G designates a soft pad which is attached to the rings B and spans the space between the same, so as to prevent injury to the fruit which might result from its coming into forcible contact with the rings.

From the above it will be seen that I have provided a simple, cheap, strong, and durable device answering all the different conditions incident to its use in picking fruit borne on trees of various natures and kinds. It will be further seen that the construction of the frame A' and rings B is such as to produce great stiffness, whereby these parts may be and are formed of sheet metal, such as tin, thereby being light, as well as cheap, without loss of necessary durability.

Having thus described my invention, what I claim is—

1. In a fruit-picker, the combination of the pole, a relatively stationary open frame projecting therefrom and having a transverse connecting-strip at its front, cups each pivotally connected at one side of its mouth to the adjacent side of the frame, longitudinally-movable arms extending through said frame and provided with flanges to engage said transverse strip, the upper ends of said arms being pivotally connected with the adjacent sides of the cups, and means for raising and lowering said arms bodily to open and close the cups.

2. In a fruit-picker, the combination of the pole, hinged depending sacks, and a tube longitudinally adjustable upon the pole and around the lower ends of the sack to inclose and protect the same, as described.

3. In a fruit-picker, the combination of a pole, an open frame fixed upon the upper end thereof, arms movable longitudinally through said frame, rings having annular flanges $b'$ and curved flanges $b^2$ projecting from said annular flanges at an angle therewith, said curved flanges being hinged both to the frame and arms, a sharpened blade projecting from one of said annular flanges, and means for moving said arms bodily to turn said rings upon their pivots.

4. The herein-described fruit-picker, comprising a pole, an open frame fixed upon the upper end and having a transverse connecting-strip at its front, arms movable longitudinally through said frame and provided with projections to engage said connecting-strip, rings having curved flanges each hinged at one side to the adjacent arm and at its other side to the contiguous side of the frame, a sharpened blade projecting from one of said rings, cups connected with said rings, and means for moving said arms bodily through said frame.

5. In a fruit-picker, the combination with the pole, and the open frame fixed upon the upper end thereof, of threaded rings each pivoted at one side to the adjacent side of said frame, arms movable longitudinally through said frame and pivoted to the other sides of said rings, removable cups having threaded mouths engaging the threaded rings, and means for moving said arms bodily.

6. In a fruit-picker, the combination of the hinged and threaded rings, and interchangeable pairs of cups, having threaded mouths, detachably secured to said rings.

7. The herein-described fruit-picker, comprising a pole, a frame secured to the upper end thereof, longitudinally-movable arms, threaded rings, having flanges hinged to said frame and arms, and interchangeable sets of cups threaded upon said rings, one set of said cups having depending sacks formed of a fabric, and the other set thereof being concavo-convex and formed of metal.

In testimony whereof I affix my signature in presence of two witnesses.

DAVID J. ETLY.

Witnesses:
CHAS. D. MEYERS,
JOSEPH SHORT.